UNITED STATES PATENT OFFICE.

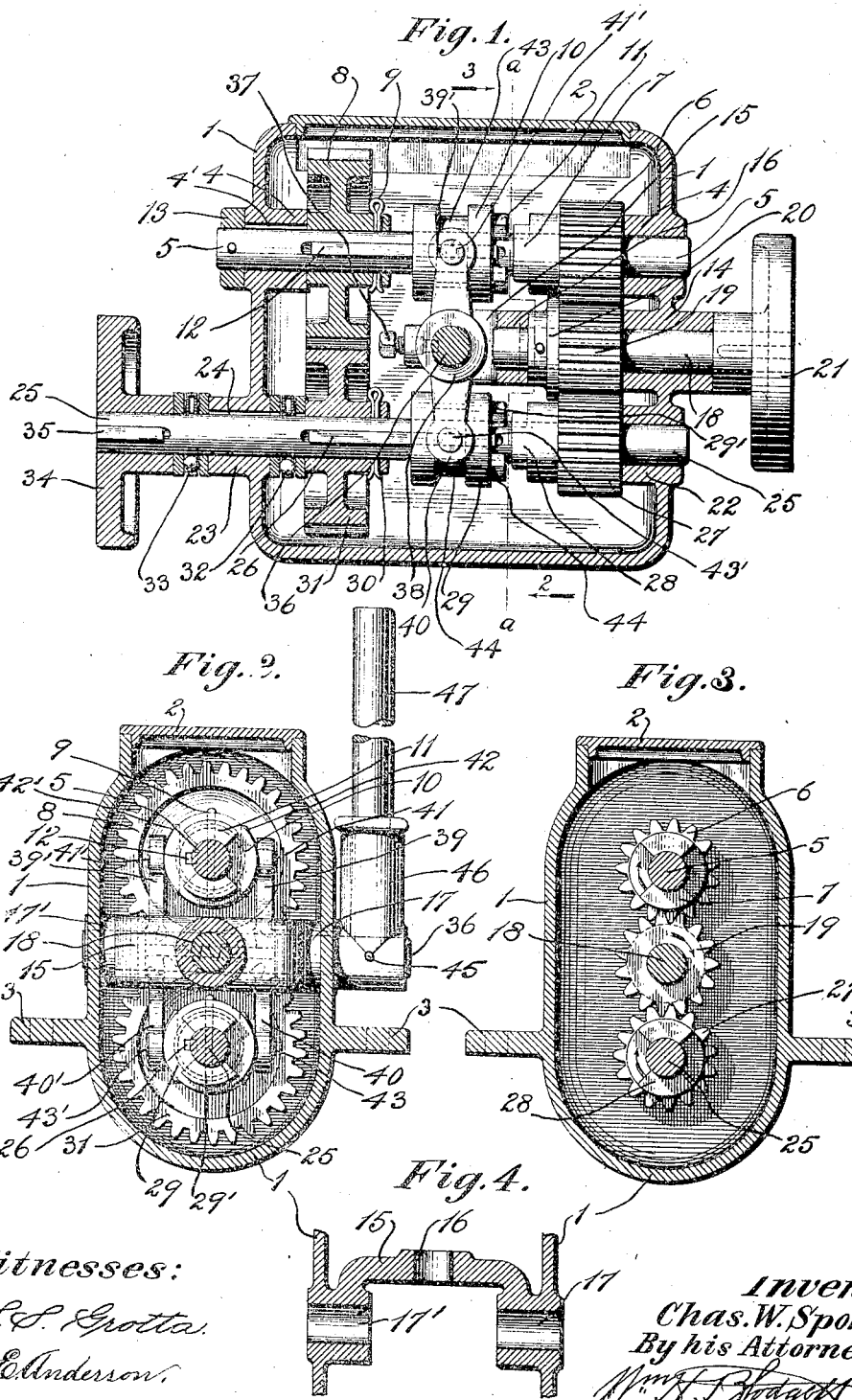

CHARLES W. SPONSEL, OF HARTFORD, CONNECTICUT.

REVERSING-GEAR.

No. 870,802.

Specification of Letters Patent.

Patented Nov. 5, 1907.

Application filed April 3, 1906. Serial No. 309,628.

*To all whom it may concern:*

Be it known that I, CHARLES W. SPONSEL, a citizen of the United States, residing at Hartford, in the county of Hartford and State of Connecticut, have invented certain new and useful Improvements in Reversing-Gears, of which the following is a specification.

This invention relates to driving-mechanism particularly designed for use with vehicles or conveyances of any kind, for instance, motor-boats, automobiles, etc., and is what is known technically in the art as a "reversing gear". While useful in the relation mentioned it is distinctly to be understood that the invention is limited to no specific art, nor to any particular application or use.

Primarily the object of the invention is the provision of a reversing-gear of simple construction—one that will be powerful, will apply the driving effect in an improved manner, and one that may be cheaply manufactured, and will accomplish its work untrammeled by the divided shafts or other details of complication frequently found in the class of mechanism to which the invention relates.

In the preferred embodiment of the invention it comprises a shell or casing intended to be filled with oil or other lubricant, and provided with alined sets of bearings for integral shafts disposed in parallelism, or substantially in parallelism, with each other.

Other objects of the invention refer to details of construction hereinafter explained.

In the accompanying drawings, Figure 1 is a longitudinal vertical section of the improvement showing partially in elevation and partially in section the details of the invention. Fig. 2 is a section taken on line *a—a* of Fig. 1, looking in the direction of the arrow 2. Fig. 3 is a section taken said on line *a—a*, Fig. 1 and looking in the direction of the arrow 3. Fig. 4 is a detail sectional view of a bridge or reinforce connecting the sides of the casing.

Referring to the drawings, the numeral 1 designates a casing for containing the improved gear, said casing to be filled with oil or other lubricant, as stated, and having at its top a cover 2, as illustrated in Figs. 1, 2 and 3.

Projecting laterally from the casing 1 are perforated lugs 3 for the reception of usual securing-devices. (Not shown).

Inwardly projecting from the ends of the casing are alined tubular bosses or bearings 4, and in these bearings is fitted an integral shaft 5, having loosely mounted thereon adjacent to one end a gear 6 having a clutch-hub 7, and keyed and pinned thereto adjacent to its opposite end a larger gear 8, the pin being represented by the numeral 9.

Intermediate the gears 6 and 8 a clutch 10 is splined to the shaft, said clutch having, in the exemplification given, teeth 11 for engaging the complemental teeth 7 of the gear 6 when shifted toward the right.

A key or spline 12 is fitted in a groove of the shaft 5, and the clutch 10 is provided with a recess for the reception of said key. A collar 13 pinned to the end of shaft 5 prevents longitudinal displacement thereof in one direction, while the gear 8, which is pinned to said shaft as stated, holds the same against displacement in the opposite direction. Adjacent to the inner bearing 4 of the casing is formed an inwardly-projecting boss or bearing 14, and connecting the sides of the casing is a bridge 15, perforated at 16 for a purpose hereinafter stated,—said bridge also having bearings 17, 17' integral therewith, as shown, although the bridge may be a separate piece, if desired. In the bearing 16 of the bridge is received one end of a shaft 18 journaled in the bearing 14, and having rigid therewith a pinion 19, said pinion being located between the inner end of the bearing 14, and a collar 20 keyed to the shaft 18, and said collar also overlapping the side of the gear 6.

At the outer end of the shaft 18 is keyed a coupling or other device 21, to which power from the engine is applied. At one side of the bearing 14, and parallel, or substantially parallel, therewith is a bearing 22, and in line with said bearing 22 and projecting from the opposite end of the casing 1 is a bearing 23 grooved at 24 for a purpose hereinafter stated.

In the bearings 22 and 23 is journaled a shaft 25 having a key 26 and loose on the shaft 25 and adjacent to the inner end of the bearing 22 is a pinion 27 in mesh with the driving-pinion 19 of the shaft 18, said pinion 27, having a clutch-hub 28. Fitted upon the spline or key 26 of the shaft 25 is a clutch 29, having teeth 29', and pinned at 30 to said shaft beyond the clutch is a gear 31 in mesh with the gear 8 of the shaft 5. A ball-bearing 32 is loosely mounted between the outer side of the gear 31 and the inner side of the bearing 23, and another ball-bearing 33 is also loosely mounted on the shaft 25 exteriorly to said bearing 23.

Designated by 34 is a coupling for transmitting power from the shaft 25 to any desired device, for instance a propeller-shaft when the mechanism is employed as a marine gear, or the shaft of an automobile, or other device, with which the mechanism may be used, this coupling 34 being keyed to the shaft 25 as at 35, Fig. 1. In the bearings 17 17' of the casing, said bearings being connected by the bridge 15, as stated, is journaled a rock-shaft 36, and secured to said rock-shaft by a screw 37 or otherwise is the hub 38 of a lever-device for alternately shifting the clutches 10 and 29, as will be hereinafter explained. This lever-device in the illustration given comprises a pair of parallel arms 39, 39' at one side of the axis of the shaft and a pair of like arms 40—40' at the other side of the shaft 36. In each arm at one end thereof is fitted a pin 41—41', respectively, said pin carrying a shoe 42, 42', respectively, which pins are located in the groove 43 of the clutch 10.

At the opposite ends the arms 39, 39' are equipped with similar pins and shoes 43, 43', respectively, the shoes being received in the groove 44 of the clutch 29. Keyed to the shaft 36 at 45 is the hub of a socket 46 in which is placed a manipulating-lever 47 for rocking the shaft and alternately shifting the clutches, which lever may be located at either end of said shaft.

In the left-hand-bearing 4 of the casing is formed a groove or key-way 4' for a purpose hereinafter stated.

From what has been described it will be seen that in the present invention a compact form of reversing-mechanism is provided, and that power from the engine-shaft 8 is applied intermediate the pinions 6 and 27, thereby driving said pinions in the same direction when the clutches are in the neutral positions illustrated in Fig. 1 or are alternately connected as described. When it is desired to drive the shaft 25 direct the rock-shaft 36 will be turned to the left by the handle 47, and will throw the clutch 29 into engagement with the complemental clutch 28 of the gear 27, and as said clutch 29 is keyed to said shaft 25 it will be obvious that power will be directly applied thereto from the engine or motor-shaft 18.

When it is desired to reverse the mechanism, lever 47 will be shifted to the right thereby actuating the rock-shaft 36 to throw the clutch 29 out of engagement with the clutch-hub of gear 27, and the clutch 10 into engagement with the clutch-hub 7 of the gear 6, locking said gear 6 to the shaft 5 and causing said shaft to be driven by the pinion 19 of driving-shaft 18, the power being transmitted from said shaft 5 by means of the gears 8 and 31, and thereby imparting a reverse movement to the driven-shaft 25.

When it is desired to stop the mechanism the clutches are simply shifted to the neutral position as illustrated in Fig. 1.

It will be observed that in the improved construction illustrated and set forth each shaft of the mechanism is an integral and not a divided shaft, and that the power being applied by the pinion 19 at a point intermediate the shafts 5 and 25 the pinions 6 and 27 will be continuously driven in the same direction while the mechanism is in operation, while the driving-shaft always rotates in a direction opposite to that of said pinions.

In assembling the parts of my improved mechanism the shafts may all be readily inserted in their bearings without inconvenience,—the grooves 4' and 24 of the bearings, the latter groove being continued through the roller-bearing 32, permitting the keys 12 and 26 readily to enter the casing.

As will be evident from the above description, the improvement results in a gear in which the power is applied between a pair of integral shafts; that the casing may be readily cast with the journal-bearings described, and then machined at but little cost; and that all shafts may be of the same diameter, if desired; that the mechanism comprises a less number of parts than those in common use, is simple in construction, cheap to manufacture, strong and durable and of less weight than the gears ordinarily employed; but eight bearings are necessary in the casing, which may be cast and machined in one piece; and that but five gears and three shafts are employed.

In the construction illustrated the same speed is given while running in either direction, but this is immaterial, as the gears may be changed to drive one way at a certain speed and another way at a different speed.

Any forms of clutches may be substituted for those shown, the invention not being limited in this respect, and various changes in detail and in the positions of the shafts may also be made without departure from the invention.

Having thus described the invention, what I claim is—

1. The combination, with a casing consisting of a casting having a bridge integral therewith, and connecting its sides, said bridge provided with bearings, of a driving-shaft journaled in the casing and bridge; a gear rigid with said driving-shaft; a pair of integral driven shafts, one on each side of said driving-shaft; gears loose on the driven shafts, and each carrying a clutch-element; clutches splined to the driven-shafts; means for actuating said clutches; and engaging gear-elements between the driven shafts.

2. The combination, with a casting having three sets of bearings in line with each other, of a driving-shaft journaled in the intermediate set of bearings; a gear rigid with said driving-shaft; shafts journaled in the other sets of alined bearings; gears loose on said shafts, and in constant mesh with the gear on said driving-shaft; clutches splined to the driven shafts; lever-mechanism for shifting said clutches; and a pair of intermeshing gears, one carried by each driven shaft.

3. The combination, with a casing, having sets of alined bearings, and a bridge connecting one set of said bearings, and provided with a bearing located at an angle to the connected set of bearings, of a driving-shaft journaled in the casing, and in the bearing of said bridge; a gear rigid with said driving-shaft; driven shafts journaled in the other alined bearings of the casing; gears loose on the driven shafts, and each having a clutch-element; a rock-shaft journaled in the bearings of the bridge; lever-arms carried by said rock-shaft; clutches operated by said lever-arms, and in sliding connection with the driven shaft; means for operating the rock-shaft; and gearing connecting the driven shafts.

4. The combination, with a casing having alined bearings in its sides, of a bridge connecting said bearings; a driving-shaft journaled at one end in said bridge, and at its power-end in the casing; a gear rigid with said driving-shaft; driven shafts, one on each side of the driving-shaft; gears loose on said driven shafts, and each having a clutch-element, said gears being in constant engagement with the gears loose on the driver shafts, whereby they are driven in the same direction; connecting gears, one rigid with each driven shaft; clutches in sliding engagement with the driven shaft; a rock-shaft journaled in the bearings of the bridge; and devices connecting said rock-shaft with the clutches on the driven shafts.

In testimony whereof I affix my signature in presence of two witnesses, at Hartford, Ct. this 31st day of March, 1906.

CHARLES W. SPONSEL.

Witnesses:
SIDNEY S. GROTTA,
F. E. ANDERSON.